United States Patent Office 3,080,354
Patented Mar. 5, 1963

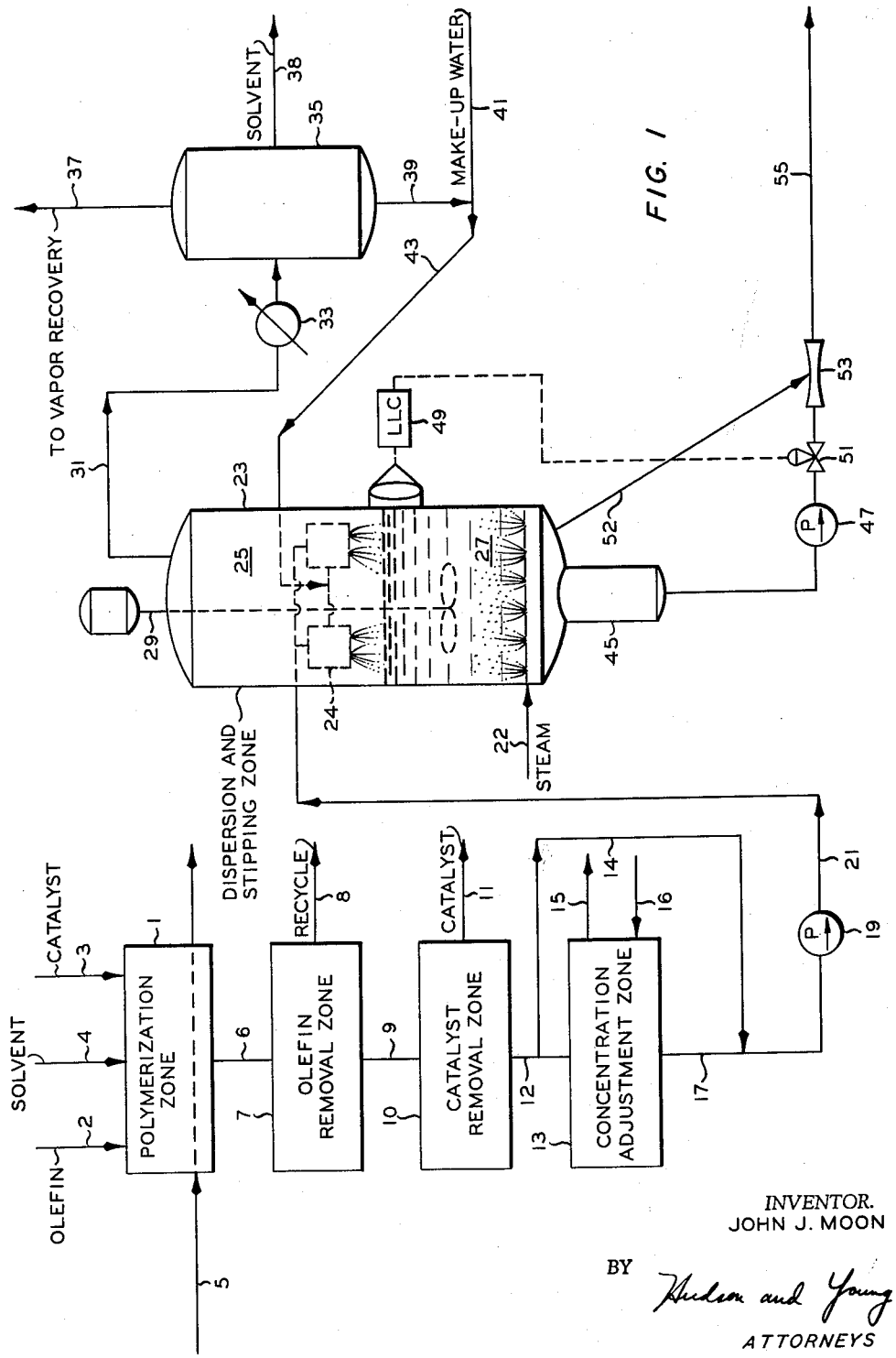

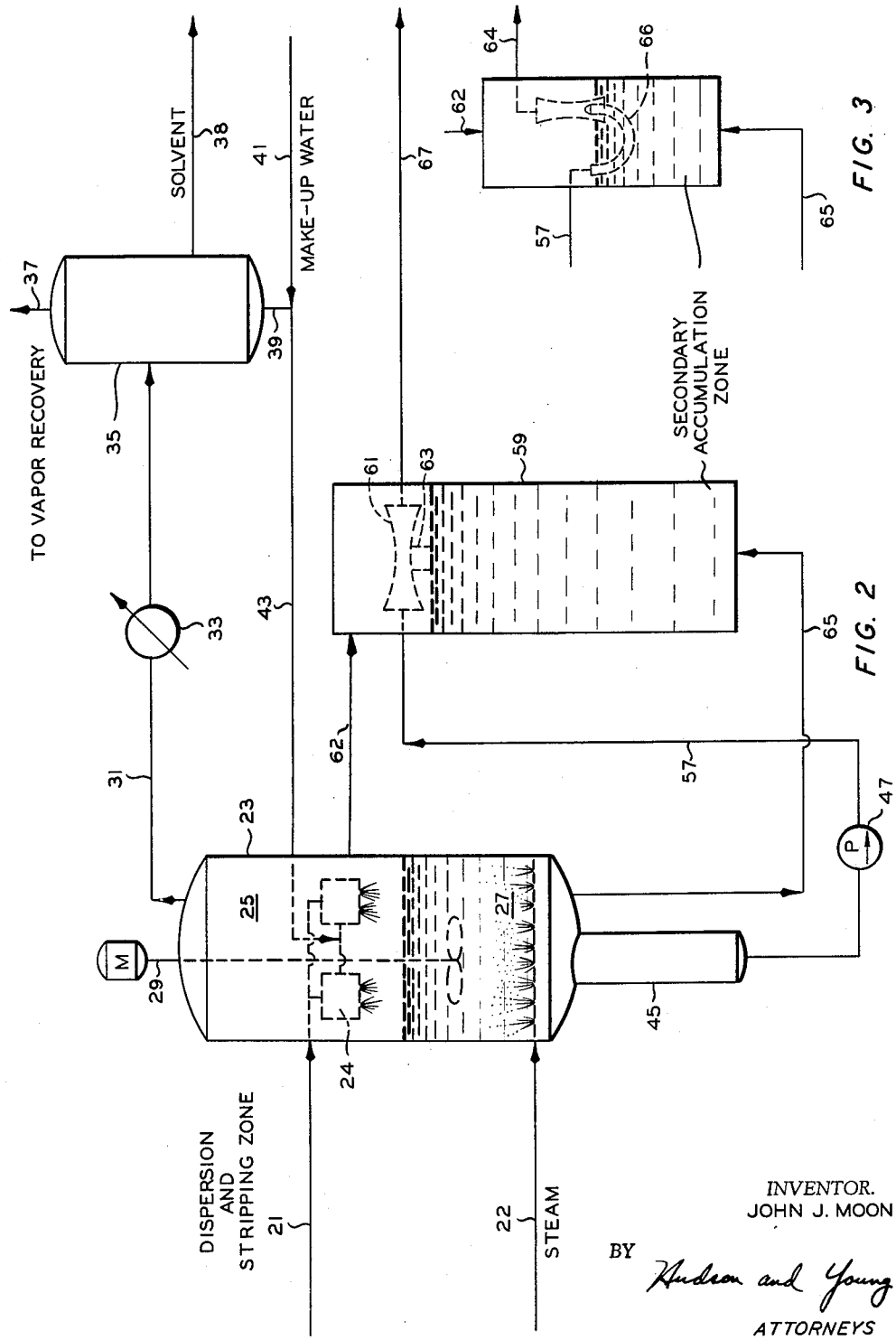

3,080,354
HANDLING OF POLYMER SLURRIES
John J. Moon, Bartlesville, Okla., assignor to Phillips Petroleum Company, a corporation of Delaware
Filed May 23, 1957, Ser. No. 661,161
9 Claims. (Cl. 260—94.9)

This invention relates to the handling of polymer slurries. In one aspect it relates to the removal of an olefin polymer slurry from a vessel at a controlled rate and entraining said slurry in a flowing liquid.

In certain methods of preparing solid polymers the reaction product is obtained as a solution of polymer in a solvent or diluent material. Since the major uses of the polymer require a solid product it is desirable that the polymer be separated from the solvent material, such as by precipitation methods. In one method a slurry of precipitated polymer in solvent is provided by spraying a solution of polymer into liquid water whereby the polymers are dispersed in the water and removed from solution. After the precipitation step the polymer is present in a subdivided solid form mixed with water and solvent. It has been found that the recovery of such solid can be effected by stripping the solvent therefrom with steam, after which a slurry of polymer in water is removed from the stripping vessel for further treatment to separate and recover a dry solid polymer product. Because of the physical nature of the polymer material it has been found that removal of the polymer slurry and transportation thereof by means of conventional pumping equipment is unsatisfactory due to adherence of the polymer to the inner surfaces and parts of the pumping apparatus and eventally plugging of the same.

It is an object of this invention to provide improved process and apparatus for the polymerization of olefins to solid polymers.

Another object of this invention is to provide improved process and apparatus for handling and transporting a slurry of solid olefin polymers.

Still another object of the invention is to provide improved process and apparatus for removing a slurry of solid olefin polymer from a vessel.

Yet another object of this invention is to provide improved process and apparatus for removing a slurry of solid olefin polymer from a vessel at a controlled rate.

These and other objects of the invention will become more readily apparent from the following detailed description and discussion.

The foregoing objects are achieved broadly by withdrawing an olefin polymer slurry from an accumulation zone, entraining the slurry in a flowing liquid and controlling the rate of said slurry withdrawal responsive to the slurry level in said zone.

In one aspect of the invention the polymer is slurried in liquid which is heavier than the polymer, and liquid, essentially free from polymer, is settled and withdrawn from the accumulation zone for use as the polymer slurry entraining liquid.

In another aspect of the invention the rate of slurry withdrawal is varied by controlling the flow rate of the entraining fluid responsive to changes in the slurry level in the accumulation zone.

In still another aspect of the invention a secondary accumulation zone openly communicating with the principal accumulation zone is provided and slurry is entrained at a predetermined level in said secondary zone in a stream of flowing liquid, the flow rate of said liquid exceeding at all times the minimum flow rate required to maintain a constant level in the secondary accumulation zone whereby a constant level is maintained in the principal accumulation zone.

The process of this invention is applicable in general to the treatment of olefin polymers such as for example homopolymers or copolymers of monoolefins like ethylene, propylene, butylene, etc., also copolymers of monoolefins and diolefins such as butadiene, isoprene, etc.

These polymers are prepared usually by contacting the olefin to be polymerized with a catalyst at an elevated temperature and pressure, preferably in the presence of a solvent of diluent material. The temperature required for polymerization varies over a wide range; however, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio etc.

The polymerization pressure is often maintained at a sufficient level to assure a liquid phase reaction, that is at least about 100 to 300 p.s.i.g., depending upon the type of feed material and the polymerization temperature. Higher pressure up to 500 to 700 p.s.i.g. or higher can be used, if desired. When utilizing a fixed bed of catalyst the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight and the residence time can be from 10 minutes or less to 10 hours or more.

A preferred polymerization method is described in detail in patent of Hogan and Banks, Patent No. 2,825,721 issued March 4, 1958. This particular method utilizes a chromium oxide catalyst, containing hexavalent chromium, with silica, alumina, silica-alumina, zirconia, thoria, etc. In one embodiment of this application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane etc. Aromatic diluents are also used, however in some instances they (or impurities therein) tend to shorten the catalyst life, therefore their use will depend on the importance of catalyst life. All of the foregoing and in addition other hydrocarbon diluents which are relatively inert and in the liquid state at the reaction conditions may also be employed in carrying out the reaction of olefins to form solid polymers.

It is apparent from the preceding discussion that the solid polymers prepared by the aforedescribed methods are present in the reaction effluent as a solution or suspension of polymer in the solvent or diluent. Inasmuch as the major uses of the polymers often require a solid product it is desirable that the polymer be separated from the solvent material. As previously mentioned, in one method for accomplishing this result the polymer solution is sprayed into cooled liquid water whereby the polymer is dispersed in the water and removed from solution. Following this operation the precipitated polymer is slurried in the mixture of water and solvent and introduced to a stripping zone wherein the removal of solvent is effected by steam stripping.

In carrying out this invention in its broad aspect a slurry of polymer solids in water and solvent is introduced to a stripping zone and contacted therein with stripping steam whereby solvent is vaporized, passing overhead from the stripping zone along with the stripping steam. The polymer accumulates in the lower portion of the stripping zone as a slurry in the water phase. Dispersion of the polymer, which tends to separate and rise to the top of the water, is effected by agitation, such as by a mechanical mixer.

The conditions employed in the stripping operation depend on the type of solvent which is employed and the particular olefin polymer from which the solvent is being removed. Thus, for example, when separating cyclohexane from ethylene polymer, the stripping operation is preferably carried out at a temperature in the range of between 170 and about 200° F. and at a pressure of between about 14.7 and about 50 p.s.i.g., and preferably as low as possible. The quantity of steam employed also varies; however, usually the steam is supplied in an amount to provide a mole ratio of steam to cyclohexane of between about 1 to 1 and about 4 to 1. To provide a desirable polymer slurry both in the stripping zone and after this material is removed therefrom it is preferred to maintain the polymer concentration in water between about 0.5 and about 3 percent by weight. Since the coagulation water is usually not sufficient for this purpose, an additional amount of water is added to the stripping zone, this material usually being added to the water-solvent-polymer mixture before the mixture is introduced to the vapor space of the stripping zone. However, water can also be added to the polymer-water accumulation in said zone.

The polymer-water slurry is withdrawn from the stripping zone and introduced to a stream of flowing liquid, being entrained and transported in said liquid for further processing. To maintain an accumulation of polymer and water in the stripping zone the level therein is controlled by appropriately controlling the rate of slurry withdrawal. Two methods are provided for this purpose. In one method the slurry passes from the accumulation in the stripping zone downwardly through an unrestricted elongated zone directly into the flowing stream of entraining liquid. A liquid level control on the stripping zone is provided and this control by means of pressure or an electrical impulse controls the flow rate of the entraining fluid, for example, by actuating a control valve in the entraining fluid line, by controlling the pump which supplies the entraining fluid, etc. Thus, when the level in the stripping zone falls below the value for which the level controller is set, the entraining fluid flow rate is decreased which decreases the rate of polymer slurry withdrawal, and vice versa.

In the other method for controlling the level in the stripping zone an auxiliary accumulation zone is provided, the bottom portion of which openly communicates through an unrestricted elongated zone with the bottom portion of the stripping zone. The polymer water slurry is thus able to flow freely from the stripping zone into the secondary accumulation zone. At a predetermined level in the latter zone the slurry enters a stream of flowing liquid, being entrained therein and removed from the system. In this particular method of operation the entraining liquid is pre-set in quantity to provide a withdrawal rate of polymer slurry from the secondary zone which at all times exceeds the minimum withdrawal rate to maintain the level in this zone. By operating in this manner the level in the secondary zone is established and held constant which in turn establishes and holds constant a slightly higher level in the stripping zone. The difference in level between the two zones is necessary to provide the hydraulic head necessary for passage of the polymer slurry between the two zones.

For the purpose of removing and transporting the polymer slurry various entraining fluids can be used. In a preferred embodiment of the invention, however, the entraining fluid is the same fluid which provides the polymer slurry, namely, water. Entraining water can be supplied from external sources, although preferably the water is obtained from the stripping zone. Inasmuch as the polymer is lighter than the water and can be maintained as a slurry only by agitation, entraining water is easily obtained by providing a separating zone in or communicating with the lower portion of the stripping zone wherein agitation is at a minimum and from which water, substantially free of polymer, can be withdrawn. The quantity of entraining water required varies depending on the amount of polymer slurry to be withdrawn from the stripping zone and the concentration of polymer in the slurry. Usually the amount of entraining liquid utilized varies between about ½ and about 4 volumes per volume of polymer slurry to be entrained.

In order to more fully describe the invention and provide a better understanding thereof reference is had to the accompanying drawings, of which FIGURE 1 is a diagrammatic illustration of a stripping zone and apparatus for carrying out the embodiment of the invention wherein the liquid level in the stripping zone is controlled by the flow rate of the entraining fluid, and FIGURE 2 is a diagrammatic illustration of a stripping zone, a secondary accumulation zone and associated apparatus suitable for carrying out the embodiment of the invention wherein the liquid level in the stripping zone is controlled by the level in the secondary accumulation zone, and FIGURE 3 is a diagrammatic illustration of another embodiment of the secondary accumulation zone.

Referring to FIGURE 1 a feed stream comprising an olefin such as ethylene is introduced to polymerization zone 1 through conduit 2. A chromium oxide catalyst containing hexavalent chromium associated with silica-alumina is introduced to said polymerization zone through conduit 3. The catalyst is usually dispersed in at least a portion of a solvent material. Any additional solvent (cyclohexane) is added to the polymerization zone through conduit 4. The materials in each of the conduits 2, 3 and 4 are preferably at polymerization temperatures, however, one or more of the streams can be cooler with the remaining streams warmer, so that the resulting dispersion is at the proper temperature. It should also be understood that the monoolefins and solvent can be pre-mixed if desired. The polymerization reaction is exothermic so that it is necessary to remove heat from the polymerization zone. This can be accomplished by indirect heat exchange, for example, by the use of cooling water introduced through conduit 5. The polymerization reaction is usually carried out at a temperature of about 250° F. and about 300 p.s.i.a. Effluent from the polymerization zone is passed through conduit 6 to zone 7 wherein unreacted olefins are vaporized and removed via conduit 8 for recycle to the polymerization zone. In this same stage any undissolved polymer is dissolved by heating, additional solvent being added as desired (not shown). The mixture from zone 7 passes through conduit 9 to catalyst removal zone 10 wherein the solution and catalyst are separated. The catalyst is removed via conduit 11, either being discarded or subjected to additional treatment, such as, regeneration for reuse in the polymerization reaction. The polymer solution is removed from separation zone 10 through conduit 12. In general the polymer concentration in conduit 12 is low and solvent is removed from zone 13 via conduit 15. On the other hand, if the concentration is high, solvent can be added through conduit 16. The solution is cooled in this zone either by evaporation or by cooled solvent to about 240° F. The polymer concentration is adjusted to about 4½% polymer and the solution is passed through conduit 17, pump 19 and conduit 21 to dispersion and stripping zone 23 wherein the polymer solution is dispersed in water of lower temperature so as to cause polymer to precipitate under conditions such that water and solvent remain in the liquid phase. In this embodiment, the solution passes from conduit 21 into nozzles 24 disposed in zone 23 and is contacted with water introduced through conduit 43 into the polymer solution stream. Dispersion by spray nozzles is preferred; however, other dispersion means such as a colloid mill, mixing tee, combination of these means and the like can also be used. Sufficient water at a temperature of about 110° F. is admixed with the solution during dispersion to provide a temperature in the range of 110 to 150° F. and preferably about 140° F. The resulting dispersion passes from nozzles 24 into the vapor space of the dispersion and stripping zone wherein it is contacted with steam introduced through conduit 22. A sufficient quantity of steam is provided in the stripping zone to assure vaporization and removal of solvent from the dispersion. The polymer and water which remain after stripping accumulate in the lower portion 27 of zone 23. Since the polymer is lighter than water and tends to rise to the surface a mixer 29 driven by a motor is provided to maintain the solids in dispersion.

A mixture of steam and solvent vapors passes overhead from the dispersion and stripping zone through conduit 31 and condenser 33 and enters separator 35 wherein the hydrocarbon and water are resolved into separate phases. The water is withdrawn from the phase separator through conduit 39 and is returned as recycle to the dispersion zone through conduit 43. Make up water, as required, is introduced through conduit 41. The cyclohexane is removed from the separator through conduit 38 and is reused in the polymerization process, as desired. Any inert gases or light hydrocarbon gases present in the overhead pass from the accumulator through conduit 37 to a vapor recovery system (not shown).

A leg 45 is provided in the bottom portion of the dispersion and stripping zone wherein water free from polymer can collect. This water is withdrawn through pump 47, passing through control valve 51 and eductor 53 wherein polymer slurried in water is entrained and yielded from the system through conduit 55. The polymer slurry is provided to eductor 53 through an unrestricted elongated conduit 52 which communicates with the lower portion of the dispersion and stripping zone. Liquid level control 49 is provided for the purpose of controlling the level in the dispersion and stripping zone. This level controller actuates a conventional control valve 51 to control the flow rate of entrained water and thereby control the quantity of slurry removed from the dispersion and stripping zone. By operating in this manner and by controlling the various streams entering the dispersion and stripping zone, including the make-up water stripping steam and coagulating water, it is possible to operate the dispersion and stripping zone with a substantially constant level and provide a polymer slurry of substantially uniform composition.

In another embodiment of the invention, as previously described, a secondary accumulation zone is utilized for the purpose of controlling the level in the dispersion and stripping zone. Referring to FIGURE 2, a dispersion and stripping zone with an overhead condensing system and a bottom leg for the accumulation of polymer-free water are again provided, these apparatus elements corresponding to those described in the discussion of FIGURE 1. As in FIGURE 1 water is withdrawn from leg 45, passed through pump 47 and then through conduit 57 and eductor 61. The eductor, however, is positioned in a secondary accumulation zone 59 at a predetermined level such that when the polymer slurry level in the secondary zone is adjacent to the eductor, the desired level in the dispersion and stripping zone is maintained. The two zones are joined by an openly communicating conduit 65 which attaches to the lower portion of each zone.

In the operation of the apparatus of FIGURE 2 the flow of water through pump 47 and eductor 61 is established to provide a rate which at all times exceeds the minimum rate which is required to remove sufficient polymer slurry from the dispersion and stripping zone to maintain a constant level therein. The polymer slurry in the dispersion and stripping zone passes through conduit 65 upwardly into the secondary accumulation zone 59 and enters eductor 61 through opening 63. Since the flow rate of liquid through the eductor is more than sufficient to remove the maximum flow of polymer slurry which can be withdrawn from the dispersion and stripping zone, the level of polymer slurry in the secondary accumulation zone is automatically maintained at the eductor level. This operates to maintain a constant level in the dispersion and stripping zone, said level being slightly higher than the level in the secondary accumulation zone to provide the head necessary for passage of the slurry from one zone to the other. A conduit 62 is provided between the vapor spaces of the two zones to allow passage of a small quantity of gases from the dispersion and stripping zone to the secondary accumulation zone to prevent pulling a vacuum in the latter zone.

The preceding discussion has been directed to preferred embodiments of the invention. However, this is not intended in any limiting sense and it is within the scope of the invention to provide other apparatus and process arrangements which are suitable for carrying out the invention. Thus, it is within the scope of the invention to employ extraneous water as the polymer-slurry entraining medium or fluids other than water. Again, instead of venting gases from the vapor space of the stripping and dispersion zone to the secondary accumulation zone, an extraneous inert gas can be introduced to this zone. Also it is within the scope of the invention to employ various types of educting means. For example, in FIGURE 3 there is illustrated an eductor means which is particularly applicable in the transporting of solids or liquids containing solids. Referring to FIGURE 3, eductor 64 comprises a curved conduit means which terminates in a nozzle, said nozzle being positioned vertically in a throat member similar to eductors 53 and 61, illustrated in FIGURES 1 and 2. In the operation of the apparatus of FIGURE 3 polymer slurry is again introduced to the secondary accumulation zone through conduit 65 and is entrained in liquid introduced to the eductor 64 through conduit 57, the combined stream leaving the secondary accumulation zone through conduit 64. A conduit 62 between the vapor spaces of the dispersion and stripping zone and the secondary accumulation zone is also provided to prevent a reduction in the pressure below atmospheric in the vapor space of the latter zone.

In each of the following examples an ethylene polymer is prepared in a reactor in the presence of a catalyst comprising about 2.5 percent by weight of chromium as chromium oxide, containing about 2.2 percent by weight of hexavalent chromium, associated with silica-alumina (weight ratio 9:1), prepared by impregnating the silica-alumina with a solution of chromium oxide followed by drying and activation in dry air and gradually increasing temperatures up to 950° F. at which the catalyst is maintained for about five hours.

The operating conditions utilized in the formation of the polymer are as follows:

| | |
|---|---|
| Ethylene feed rate _____ lb./hr__ | 370 |
| Cyclohexane feed rate _____ lb./hr__ | 2600 |
| Polymer concentration in reactor ____ wt. percent__ | 9.0 |
| Catalyst concentration in reactor _____ do ____ | 0.3 |
| Pressure _____ p.s.i.g__ | 420 |
| Temperature _____ °F__ | 280 |

In Example I the reactor effluent is processed in a series of operations corresponding to those shown in FIGURE 1 of the drawings including unreacted ethylene removal, catalyst removal, effluent concentration and precipitation of the polymer in water. Following this operation the polymer, slurried in water, is itroduced to a stripping zone for the removal of solvent and further treatment of the polymer in accordance with one embodiment of the invention under the following conditions:

*Example I*

Flow rates:
  Feed to stripper (21) _____ lb./hr__ 7,980
    Composition: Polymer, 4.5 wt. percent;
    Cyclohexane, 95.5 wt. percent.
  Stripping steam (22) _____ lb./hr__ 3,350
  Dispersion and make-up water (43) lb./hr— 20,680
  Stripper overhead (31) _____ lb./hr__ 8,880
    Composition: Cyclohexane, 95.65 wt.
    percent; Water, 4.35 wt. percent.
  Slurry entrainment water (45) _____ lb./hr__ 6,000
  Polymer slurry product (55) _____ lb./hr__ 24,000
    Composition: Polymer, 1.5 wt. percent;
    Water, 98.5 wt. percent.
Temperatures:
  Stripper (23) _____ °F__ 170
  Stripper overhead accumulator (35) ___ °F__ 105
Pressures:
  Stripper (23) _____ p.s.i.g__ 15.7
  Stripper overhead accumulator (35) p.s.i.g__ 14.7

In Example II data is presented illustrating a commercial application of the embodiment of the invention shown in FIGURE 2.

*Example II*

Flow rates:
  Feed to stripper (21) _____ lb./hr__ 7,980
    Composition: Polymer, 4.5 wt. percent;
    Cyclohexane, 95.5 wt. percent.
  Stripping steam (22) _____ lb./hr__ 3,350
  Dispersion and make-up water (43) lb./hr__ 22,680
  Stripper overhead (31) _____ lb./hr__ 8,880
    Composition: Cyclohexane, 95.65 wt.
    percent; Water, 4.35 wt. percent.
  Slurry entrainment water (45) _____ lb./hr__ 8,000
  Polymer slurry product (67) _____ lb./hr__ 26,000
    Composition: Polymer, 1.38 wt. percent;
    Water, 98.62 wt. percent.
Temperatures:
  Stripper (23) _____ °F__ 170
  Stripper overhead accumulator (35) ___ °F__ 105
Pressures:
  Stripper (23) _____ p.s.i.g__ 15.7
  Stripper overhead accumulator (35) p.s.i.g__ 14.7

Having thus described the invention by providing specific examples thereof, it is to be understood that undue limitations or restrictions are not to be drawn by reason thereof and that many variations and modifications are within the scope of the invention.

We claim:

1. A method for handling and transporting on olefin polymer slurry, which comprises withdrawing said slurry from an accumulation zone through an unrestricted elongated zone to a secondary accumulation zone, introducing said slurry into a confined liquid flowing through a constricted elongated zone at a predetermined level in said secondary accumulation zone so as to maintain a predetermined level in said accumulation zone, said predetermined level being higher in elevation than the bottom of the primary accumulation zone, entraining said slurry in said flowing liquid and withdrawing said slurry from the secondary accumulation zone.

2. A method for handling and transporting an olefin polymer slurried in a liquid heavier than said polymer which comprises withdrawing said slurry from an accumulation zone having a settling zone in open communication therewith wherein slurrying liquid separates from polymer, removing polymer-free liquid from the settling zone and flowing said liquid through a constricted elongated zone, withdrawing said slurry from the accumulation zone through an elongated unrestricted zone into the flowing liquid in said constricted elongated zone, entraining said slurry in the flowing liquid and varying the rate of slurry withdrawal responsive to the slurry level in the accumulation zone.

3. The process of claim 2 in which the rate of slurry withdrawal from the accumulation zone is controlled by controlling the flow rate of said flowing liquid.

4. The process of claim 2 in which the elongated unrestricted zone for the removal of slurry openly communicates with a secondary accumulation zone, the flowing liquid passes through said secondary zone at a predetermined level which is higher in elevation than the bottom of the primary accumulation zone and the quantity of flowing liquid is maintained at a rate which at all times exceed the minimum rate required to maintain the polymer slurry level in the secondary accumulation zone.

5. A method for handling and transporting an olefin polymer slurried in a liquid heavier than said polymer which comprises withdrawing said slurry from an accumulation zone, openly and downwardly communicating with a settling zone wherein slurrying liquid separates from said polymer, removing polymer-free liquid from said zone and flowing said liquid through a constricted elongated zone, withdrawing said slurry from the bottom portion of said accumulation zone through an elongated unrestricted zone into the flowing liquid, entraining said slurry in the flowing liquid in said constricted elongated zone and varying the rate of slurry withdrawal responsive to the slurry level in the accumulation zone.

6. The process of claim 5 in which the rate of slurry withdrawal from the accumulation zone is controlled by controlling the flow rate of said flowing liquid.

7. The process of claim 6 in which the olefin polymer is a polymer of ethylene.

8. The process of claim 5 in which the elongated unrestricted zone for the removal of said slurry openly communicates with the bottom portion of a secondary accumulation zone, the flowing liquid passes through said secondary zone at a predetermined level which is higher in elevation than the bottom of the primary accumulation zone and the quantity of flowing liquid is maintained at a rate which at all times exceeds the minimum rate required to maintain the polymer slurry level in the secondary accumulation zone.

9. The process of claim 8 in which the olefin polymer is a polymer of ethylene.

(References on following page)

References Cited in the file of this patent

UNITED STATES PATENTS

| | | |
|---|---|---|
| 2,121,258 | Osterstrom et al. | June 21, 1938 |
| 2,397,295 | Scott | Mar. 26, 1946 |
| 2,475,628 | McSweeney | July 12, 1949 |
| 2,475,643 | Seebold | July 12, 1949 |
| 2,665,646 | Garrett et al. | Jan. 12, 1954 |
| 2,724,689 | Dunmire | Nov. 22, 1955 |
| 2,766,224 | Bannon | Oct. 9, 1956 |
| 2,780,617 | Zletz | Feb. 5, 1957 |
| 2,817,692 | Penick et al. | Dec. 24, 1957 |
| 2,858,902 | Cottle | Nov. 4, 1958 |